(12) United States Patent
Kim et al.

(10) Patent No.: US 9,293,259 B2
(45) Date of Patent: Mar. 22, 2016

(54) MULTILAYER CERAMIC ELECTRONIC COMPONENT INCLUDING ELECTRODE LEAD OUT PORTIONS HAVING DIFFERENT LENGTHS

(71) Applicant: SAMSUNG ELECTRO-MECHANICS CO., LTD., Suwon, Gyunggi-do (KR)

(72) Inventors: Wi Heon Kim, Gyunggi-do (KR); Doo Young Kim, Gyunggi-Do (KR); Jae Yeol Choi, Gyunggi-Do (KR); Jong Ho Lee, Gyunggi-do (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 128 days.

(21) Appl. No.: 13/759,609

(22) Filed: Feb. 5, 2013

(65) Prior Publication Data

US 2014/0160619 A1    Jun. 12, 2014

(30) Foreign Application Priority Data

Dec. 12, 2012  (KR) .................. 10-2012-0144138

(51) Int. Cl.
*H01G 4/30* (2006.01)
*H01G 4/012* (2006.01)
(Continued)

(52) U.S. Cl.
CPC .................. *H01G 4/30* (2013.01); *H01G 4/012* (2013.01); *H01G 4/232* (2013.01); *H01G 4/12* (2013.01)

(58) Field of Classification Search
CPC ......... H01G 4/30; H01G 4/012; H01G 4/232; H01G 4/12

USPC ..................... 361/306.3, 303, 321.2
See application file for complete search history.

(56) References Cited

U.S. PATENT DOCUMENTS 6,292,351 B1 * 9/2001 Ahiko et al. ............... 361/306.3
6,683,782 B2 * 1/2004 Duva ............................ 361/311
(Continued)

FOREIGN PATENT DOCUMENTS

JP      06069063 A  *  3/1994
JP      09050935 A  *  2/1997
(Continued)

OTHER PUBLICATIONS

Japanese Office Action issued in Application No. 2013-019166 dated Nov. 26, 2013.
(Continued)

*Primary Examiner* — David M Sinclair
(74) *Attorney, Agent, or Firm* — McDermott Will & Emery LLP

(57) ABSTRACT

There is provided a multilayer ceramic electronic component, including a ceramic body including dielectric layers, and having first and second main surfaces, first and second side surfaces and first and second end surfaces; first and second internal electrodes having overlap regions forming a capacitance part, the first internal electrodes having a first lead out portion to be exposed to the first side surface, and being alternately laminated with the second internal electrodes while being insulated therefrom, the second internal electrodes having a second lead out portion; first and second external electrodes connected to the first and second lead out portions, respectively; and an insulating layer formed on the first side surface, wherein a length of the first lead out portion is longer than that of the second lead out portion and the capacitance part has different distances from the first side surface.

16 Claims, 5 Drawing Sheets

(51) Int. Cl.
  *H01G 4/232* (2006.01)
  *H01G 4/12* (2006.01)

(56) References Cited

U.S. PATENT DOCUMENTS

| | | | |
|---|---|---|---|
| 7,667,950 B2* | 2/2010 | Togashi | 361/306.3 |
| 7,936,554 B2* | 5/2011 | Itamura et al. | 361/303 |
| 8,498,096 B2* | 7/2013 | Kobayashi | 361/306.3 |
| 2005/0286203 A1* | 12/2005 | Togashi et al. | 361/301.4 |
| 2008/0100988 A1 | 5/2008 | Togashi | |
| 2008/0174934 A1 | 7/2008 | Togashi | |
| 2010/0091429 A1 | 4/2010 | Koga et al. | |
| 2010/0189882 A1* | 7/2010 | Hopper et al. | 427/102 |
| 2010/0206624 A1* | 8/2010 | Feichtinger | 174/260 |
| 2011/0096463 A1* | 4/2011 | Togashi et al. | 361/306.3 |
| 2011/0096464 A1 | 4/2011 | Togashi et al. | |

FOREIGN PATENT DOCUMENTS

| | | | |
|---|---|---|---|
| JP | 2000208361 A * | | 7/2000 |
| JP | 2006-013245 A | | 1/2006 |
| JP | 2006-086359 A | | 3/2006 |
| JP | 2008-66461 A | | 3/2008 |
| JP | 2008-71811 A | | 3/2008 |
| JP | 2008-258481 A | | 10/2008 |
| JP | 2009-026872 A | | 2/2009 |
| JP | 2009026872 A * | | 2/2009 |
| JP | 2009-054973 A | | 3/2009 |
| JP | 2011-91271 A | | 5/2011 |
| WO | 2009001842 A1 | | 12/2008 |

OTHER PUBLICATIONS

Notice of Office Action Korean Patent Application No. 10-2012-0144138 dated Dec. 27, 2013 with English translation.

* cited by examiner

MULTILAYER CERAMIC ELECTRONIC COMPONENT INCLUDING ELECTRODE LEAD OUT PORTIONS HAVING DIFFERENT LENGTHS

CROSS-REFERENCE TO RELATED APPLICATIONS

This application claims the priority of Korean Patent Application No. 10-2012-0144138 filed on Dec. 12, 2012, in the Korean Intellectual Property Office, the disclosure of which is incorporated herein by reference.

BACKGROUND OF THE INVENTION

1. Field of the Invention

The present invention relates a multilayer ceramic electronic component capable of preventing a short circuit occurring between internal electrodes and reducing acoustic noise generated in multilayer ceramic electronic components during the application of voltage.

2. Description of the Related Art

A capacitor, an inductor, a piezoelectric element, a varistor, a thermistor, and the like, are representative electronic components using a ceramic material.

Among these ceramic electronic components, a multilayer ceramic capacitor (MLCC) has a small size, is able to secure a high degree of capacitance, and has ease of mountability.

This multilayer ceramic capacitor is a chip type condenser performing a main function of charging or discharging electricity while it is mounted on a circuit board of several types of electronic product, such as a computer, a personal digital assistant (PDA), a cellular phone, or the like. The multilayer ceramic capacitor has several sizes and lamination types, depending on the intended usage and required capacitance thereof.

In particular, as the trend has been for electronic products to be reduced in size, ultra-miniaturization and the implementation of ultra-high capacitance in multi-layer ceramic capacitors have also been required.

For this reason, a multi-layer ceramic capacitor in which dielectric layers and internal electrodes are thinly formed for ultra-miniaturization of products and in which a large number of dielectric layers are laminated for the ultra-high capacitance thereof has been manufactured.

Meanwhile, there is provided a multilayer ceramic capacitor in which all external electrodes are positioned on a lower surface. In this structure of a multilayer ceramic capacitor, mounting density and capacitance thereof are excellent and ESL is low, but a short circuit between internal electrodes may easily occur due to a phenomenon in which facing internal electrodes are pushed by cutting stress at the time of cutting the ceramic body.

Related Art Document

Japanese Patent Laid-Open Publication No. 2006-086359

SUMMARY OF THE INVENTION

An aspect of the present invention provides a multilayer ceramic electronic component capable of preventing a short circuit occurring between internal electrodes and reducing acoustic noise generated in a multilayer ceramic electronic component during the application of voltage thereto.

According to an aspect of the present invention, there is provided a multilayer ceramic electronic component, including: a ceramic body including dielectric layers, and having first and second main surfaces opposing each other, first and second side surfaces opposing each other, and first and second end surfaces opposing each other; first and second internal electrodes having overlap regions forming a capacitance part for forming capacitance inside the ceramic body, the first internal electrodes respectively having a first lead out portion extended from the capacitance part so as to be exposed to the first side surface, the second internal electrodes being alternately laminated with the first internal electrodes with the dielectric layers interposed therebetween while being insulated from the first internal electrodes, and the second internal electrodes respectively having a second lead out portion extended from the capacitance part so as to be exposed to the first side surface; first and second external electrodes connected with the first and second lead out portions, respectively; and an insulating layer formed on the first side surface of the ceramic body, wherein a length of the first lead out portion in a length direction of the ceramic body is longer than a length of the second lead out portion in the length direction of the ceramic body, and wherein the capacitance part includes at least two regions having different distances from the first side surface.

Here, when a width of the ceramic body is designated as $M_1$ and a distance of one of the two regions of the capacitance part from the first side surface, being a longer distance from the first side surface, is designated as $M_2$, $0.05 \leq M_2/M_1 \leq 0.4$ may be satisfied.

The first and second internal electrodes may be disposed vertically with respect to a mounting surface of the ceramic body.

The first external electrode may be extended to at least one of the first main surface, the second main surface, and the second side surface of the ceramic body.

The second external electrode may be extended to at least one of the first main surface, the second main surface, and the second side surface of the ceramic body.

The insulating layer may include at least one selected from the group consisting of epoxy, a heat-resistant polymer, glass, and a ceramic material.

The insulating layer may cover all exposed portions of the first and second internal electrodes.

The insulating layer may be lower than a thickness of the first and second external electrodes, measured from the first side surface of the ceramic body.

According to another aspect of the present invention, there is provided a multilayer ceramic electronic component, including: a ceramic body including dielectric layers, and having first and second main surfaces opposing each other, first and second side surfaces opposing each other, and first and second end surfaces opposing each other; first and second internal electrodes having overlap regions forming a capacitance part for forming capacitance inside the ceramic body, the first internal electrodes respectively having a first lead out portion extended from the capacitance part so as to be exposed to the first and second side surfaces and being spaced apart from the first and second end surfaces by a predetermined distance, the second internal electrodes being alternately laminated with the first internal electrodes with the dielectric layers interposed therebetween while being insulated from the first internal electrodes, and the second internal electrodes respectively having a second lead out portion extended from the capacitance part so as to be exposed to the first and second side surfaces and being spaced apart from the first and second end surfaces by a predetermined distance; first and second external electrodes connected with the first and second lead out portions, respectively, and formed on the first and second side surfaces; and an insulating layer formed on the first and second side surfaces of the ceramic body, wherein a length of the first lead out portion in a length direction of the ceramic body is longer than a length of the second lead out portion in the length direction of the ceramic body, and wherein the capacitance part includes two regions having different distances from the first or second side surface.

Here, when a width of the ceramic body is designated as $M_1$ and a distance of one of the two regions of the capacitance part from the first or second side surface, being a longer distance from the first or second side surface, is designated as $M_2$, $0.05 \leq M_2/M_1 \leq 0.4$ may be satisfied.

The first and second internal electrodes may be disposed vertically with respect to a mounting surface of the ceramic body.

The first external electrode may be extended to at least one of the first main surface, the second main surface, and the first end surface of the ceramic body.

The second external electrode may be extended to at least one of the first main surface, the second main surface, and the second end surface of the ceramic body.

The insulating layer may include at least one selected from the group consisting of epoxy, a heat-resistant polymer, glass, and a ceramic material.

The insulating layer may cover all exposed portions of the first and second internal electrodes.

The insulating layer may be lower than a thickness of the first and second external electrodes, measured from the first or second side surface of the ceramic body.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
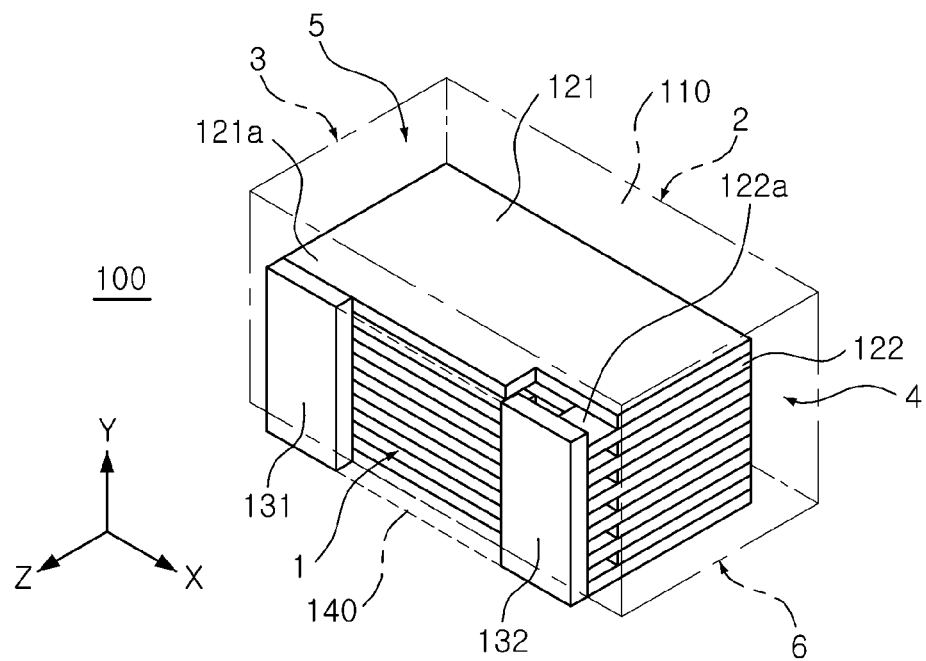
FIG. 1 is a perspective view showing a schematic structure of a multilayer ceramic capacitor according to one embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

FIG. 1 is a perspective view showing a schematic structure of a multilayer ceramic capacitor according to one embodiment of the present invention.

Figure 2:
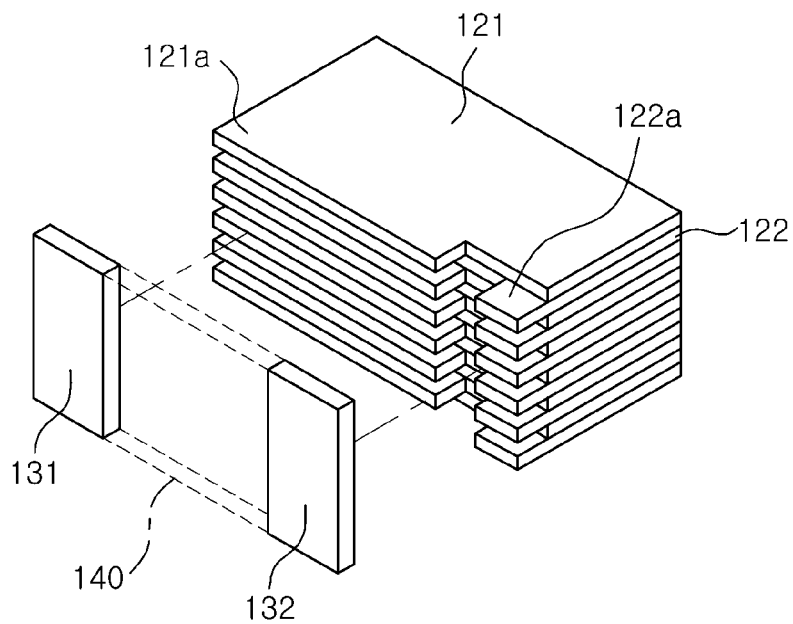
FIG. 2 is an exploded perspective view of FIG. 1.

FIG. 2 is an exploded perspective view of FIG. 1.

Figure 3:
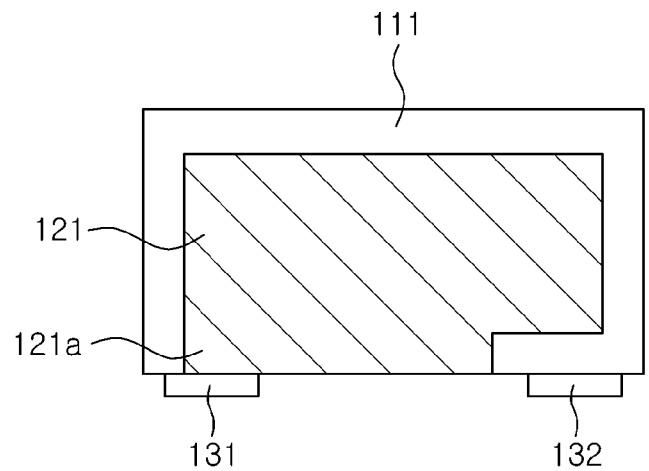
FIG. 3 is a cross-sectional view showing a combination structure of a first internal electrode and a first external electrode of FIG. 1.

FIG. 3 is a cross-sectional view showing a combination structure of a first internal electrode and a first external electrode of FIG. 1.

Figure 4:
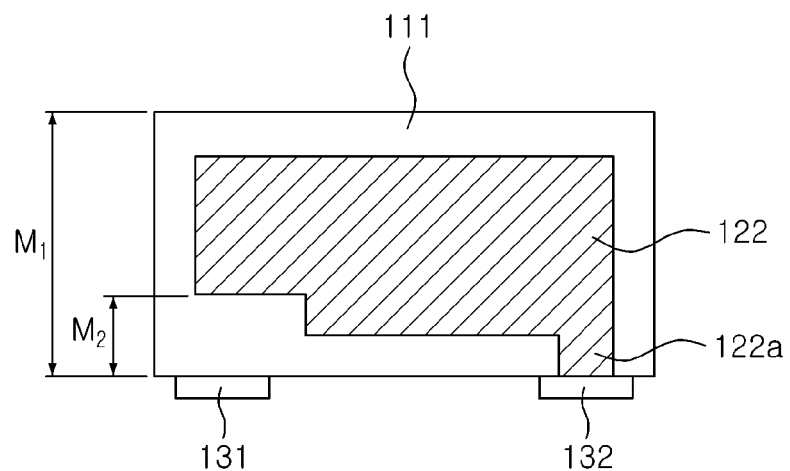
FIG. 4 is a cross-sectional view showing a combination structure of a second internal electrode and a second external electrode of FIG. 1.

FIG. 4 is a cross-sectional view showing a combination structure of a second internal electrode and a second external electrode, of FIG. 1.

Figure 5:
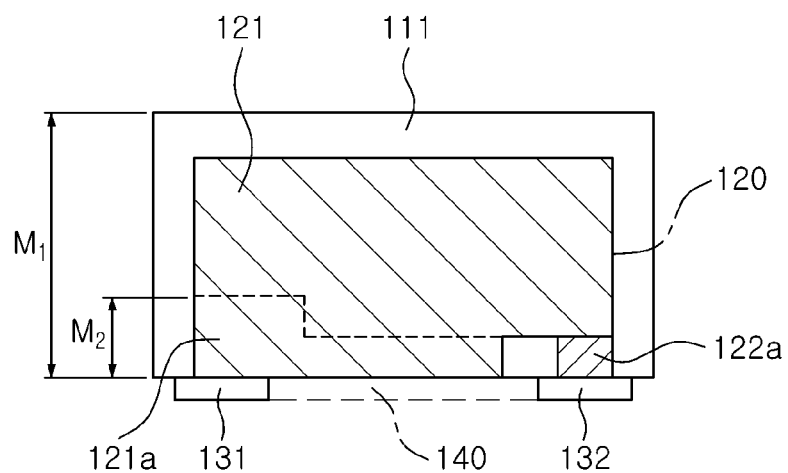
FIG. 5 is a cross-sectional view showing a combination structure of the first and second internal electrodes and the first and second external electrodes of FIG. 1.

FIG. 5 is a cross-sectional view showing a combination structure of the first and second internal electrodes and the first and second external electrodes of FIG. 1.

Figure 6:
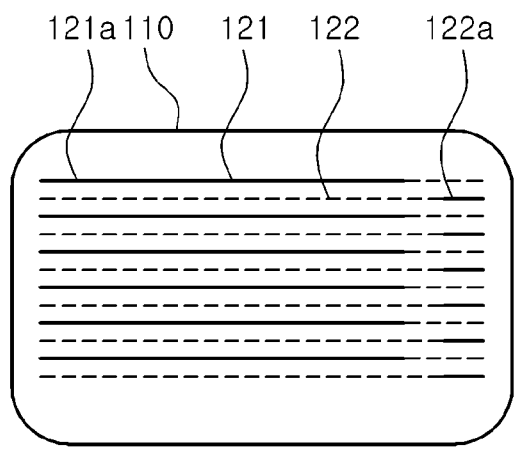
FIG. 6 is a schematic view showing an inner structure of the multilayer ceramic capacitor seen from a first side surface of FIG. 1.

FIG. 6 is a schematic view showing an inner structure of the multilayer ceramic capacitor seen from a first side surface of FIG. 1.

The multilayer ceramic capacitor of the present embodiment may be a 2-terminal vertically laminated or vertical multilayer capacitor. The term "vertically laminated or vertical multilayer" refers that internal electrodes laminated in the capacitor are disposed vertically with respect to a surface of a mounting area of a circuit board. The term "2-terminal" refers that two terminals as terminals of the capacitor are connected to the circuit board.

Referring to FIGS. 1 through 6, a multilayer ceramic capacitor 100 according to an embodiment of the invention may include: a ceramic body 110; internal electrodes 121 and 122 formed inside the ceramic body 110; an insulating layer 140 formed on one surface of the ceramic body 110; and external electrodes 131 and 132.

In the present embodiment, the ceramic body 110 may have first and second main surfaces 5 and 6 facing each other, and a first side surface 1, a second side surface 2, a first end surface 3, and a second end surface 4 connecting the first and second main surfaces 5 and 6 to each other. The shape of the ceramic body 110 is not particularly limited, but as shown in the drawings, may be a rectangular parallelepiped shape. According to the embodiment of the invention, the first side surface 1 of the ceramic body may be a mounting surface, disposed on a mounting area of a circuit board.

According to the embodiment of the invention, an x-direction may be a direction in which the first and second external electrodes are formed at a predetermined interval, a y-direction may be a direction in which the internal electrodes are laminated with dielectric layer therebetween, and a z-direction may be a direction in which the internal electrodes are mounted on the circuit board.

According to the embodiment of the invention, the ceramic body 110 may be formed by laminating a plurality of dielectric layers 111. The plurality of dielectric layers 111 constituting the ceramic body 110 is in a sintered state, and may be integrated with each other so as not to distinguish boundaries between neighboring dielectric layers.

The dielectric layer 111 may be formed by firing a ceramic green sheet containing a ceramic powder, an organic solvent, and an organic binder. The ceramic powder is a material having a high dielectric constant, and a barium titanate (BaTiO$_3$) based material, a strontium titanate (SrTiO$_3$) based material, or the like, may be used, but the ceramic powder is not limited thereto.

According to the embodiment of the invention, the internal electrodes may be formed inside the ceramic body 110.

Referring to FIGS. 3 through 5, the first internal electrode 121 having first polarity and the second internal electrode 122 having second polarity may become one pair, and may be disposed in the y-direction to face each other with one dielectric layer 111 therebetween.

According to the embodiment of the invention, the first and second internal electrodes 121 and 122 may be disposed vertically with respect to the mounting surface, that is, the first side surface 1, of the multilayer ceramic capacitor.

In the present embodiment, the first and second polarities may refer to different polarities.

According to the embodiment of the invention, the first and second internal electrodes 121 and 122 may be formed of a conductive paste containing a conductive metal.

The conductive metal may be, but is not limited to, Ni, Cu, Pd, or an alloy thereof.

Each of the internal electrode layers may be printed on a ceramic green sheet for forming the dielectric layer by using a conductive paste through a printing method such as a screen printing method or a gravure printing method.

The ceramic green sheets having the internal electrode layer printed thereon may be alternately laminated and fired, to thereby form the ceramic body.

The multilayer ceramic capacitor 100 according to the embodiment of the invention may include the first and second internal electrodes 121 and 122 having overlap regions forming a capacitance part 120 for forming capacitance inside the ceramic body 110, each of the first internal electrodes 121 having a first lead out portion 121a extended from the capacitance part 120 so as to be exposed to the first side surface 1, the second internal electrodes 122 being alternately laminated with the first internal electrodes 121 with the respective dielectric layer 111 therebetween while being insulated from the first internal electrodes 121, and each of the second internal electrodes 122 having a second lead out portion 122a extended from the capacitance part 120 so as to be exposed to the first side surface 1.

The first and second internal electrodes 121 and 122 have first and second lead out portions 121a and 122a, so as to be connected with the external electrodes having different polarities, respectively. The first and second lead out portions 121a and 122a may be exposed to the first side surface 1 of the ceramic body 110.

According to the embodiment of the invention, the multilayer ceramic capacitor is a vertically laminated or vertical multilayer capacitor, and the first and second lead out portions 121a and 122a may be exposed to the same surface of the ceramic body 110.

According to the embodiment of the invention, the lead out portion of the internal electrode may refer to a region of which a conductor pattern forming the internal electrode has an increased width to be exposed to one surface of the ceramic body.

The first and second internal electrodes 121 and 122 form a capacitance by the overlap regions thereof, and the first and second lead out portions 121a and 122a connected with the external electrodes having different polarities do not have overlap regions.

Since the first and second lead out portions 121a and 122a are insulated from each other without overlapping as described above, a short circuit occurring between internal electrodes due to a phenomenon that facing internal electrodes are pushed by cutting stress at the time of cutting the ceramic body may be prevented.

According to the embodiment of the invention, the length of the first lead out portion 121a in a length direction of the ceramic body 110 may be longer than the length of the second lead out portion 122a in the length direction of the ceramic body 110.

Since the first lead out portion 121a and the second lead out portion 122a do not overlap each other, the first internal electrode 121 may be insulated from the second internal electrode 122.

By forming the length of the first lead out portion 121a in the length direction of the ceramic body 110 to be longer than the length of the second lead out portion 122a in the length direction of the ceramic body 110, the route for removing residual carbon may be further secured in a process of firing the ceramic body.

This may further improve continuity of the internal electrode, and thus increase the capacitance of the multilayer ceramic capacitor.

Referring to FIG. 4, due to the shape of the second internal electrode 122, the capacitance part 120 formed by overlapping the first and second internal electrodes 121 and 122 each other may include at least two regions having different distances from the first side surface 1, but is not limited thereto.

As shown in FIG. 4, the capacitance part 120 may include two regions having different distances from the first side surface, but is not limited thereto.

As described above, the capacitance part 120 is disposed to include at least two regions having different distances from the first side surface 1, so that a defect such as a short circuit occurring between internal electrodes due to a phenomenon that facing internal electrodes are pushed by cutting stress at the time of cutting the ceramic body may be improved.

Referring to FIG. 5, when a width of the ceramic body 110 is designated as $M_1$ and a distance of one of the two regions of the capacitance part 120 from the first side surface 1, being a longer distance from the first side surface 1, is designated as $M_2$, $0.05 \leq M_2/M_1 \leq 0.4$ may be satisfied.

As described above, the width of the ceramic body 110, $M_1$, and the distance of one of the two regions of the capacitance part 120 from the first side surface 1, being a longer distance from the first side surface 1, $M_2$, are controlled to satisfy $0.05 \leq M_2/M_1 \leq 0.4$, so that effects of increasing the capacitance and reducing the short circuit may be obtained.

In the case in which $M_2/M_1$ is below 0.05, the short circuit occurring between internal electrodes may occur when cutting precision is deteriorated at the time of cutting the ceramic body 110.

In the case in which $M_2/M_1$ is above 0.4, the area of the capacitance part 120 formed by overlapping the first and second internal electrodes 121 and 122 each other may be decreased, and thus the capacitance may be deteriorated.

Referring to FIG. 6, it may be seen that the first and second internal electrodes 121 and 122 are alternately exposed to the first side surface 1 of the ceramic body 110.

Referring to FIGS. 3 through 5, the first external electrode 131 may be connected with the first lead out portion 121a of the first internal electrode 121 drawn to the first side surface 1 of the ceramic body 110 and the second external electrode 132 may be connected with the second lead out portion 122a of the second internal electrode 122 drawn to the first side surface 1 of the ceramic body 110.

The first external electrode 131 is formed on the first side surface 1 of the ceramic body 110 in order to be connected with the first lead out portions 121a, and may be extended to the first end surface 3 of the ceramic body 110, but is not limited thereto.

In addition, the second external electrode 132 is formed on the first side surface 1 of the ceramic body 110 in order to be connected with the second lead out portions 122a, and may be extended to the second end surface 4 of the ceramic body 110, but is not limited thereto.

That is, the first external electrode 131 may be extended to one or more of the first main surface 5, the second main surface 6, and the second side surface 2 of the ceramic body 110.

In addition, the second external electrode 132 may be extended to one or more of the first main surface 5, the second main surface 6, and the second side surface 2 of the ceramic body 110.

Therefore, according to the embodiment of the invention, the first external electrode 131 may be formed to surround one end of the ceramic body 110 in a length direction thereof while being connected with the first lead out portions 121a of the first internal electrodes 121, drawn to the first side surface 1 of the ceramic body 110.

In addition, the second external electrode 132 may be formed to surround the other end portion of the ceramic body 110 in the length direction thereof while being connected with the second lead out portions 122a of the second internal electrodes 122, drawn to the first side surface 1 of the ceramic body 110.

The first and second external electrodes 131 and 132 may be formed of a conductive paste containing a conductive metal.

The conductive metal may be, but is not limited to, Ni, Cu, Sn, or an alloy thereof.

The conductive paste may further contain an insulating material, but is not limited thereto. For example, the insulating material may be glass.

A method of forming the first and second external electrodes 131 and 132 is not particularly limited. The first and second external electrodes 131 and 132 may be formed by dipping the ceramic body, or by using the other methods such as plating and the like.

Meanwhile, according to the embodiment of the invention, the insulating layer 140 may be formed on the first side surface 1 of the ceramic body 110, as shown in FIG. 5.

The insulating layer 140 may be formed between the first and second external electrodes 131 and 132.

The insulating layer 140 may cover the first lead out portions 121a exposed to the first side surface, and may cover all the overlap regions of the first and second internal electrodes 121 and 122.

According to the embodiment of the invention, as shown in FIG. 5, the insulating layer 140 may completely fill one surface of the ceramic body 110 between the first and second external electrodes 131 and 132.

In addition, although not shown, according to the embodiment of the invention, the insulating layer 140 may cover only the first lead out portions 121a and have a predetermined interval from the first and second external electrodes 131 and 132.

According to the embodiment of the invention, the thickness of the insulating layer 140 may be lower than the thickness of the first external electrode 131 or the second external electrode 132. The thicknesses of the insulating layer and the first and second external electrodes may be measured based on the mounting surface, that is, the first side surface.

According to the present embodiment, since the thickness of the insulating layer is lower than the thickness of the first and second external electrodes, the multilayer ceramic capacitor 100 may be mounted on the circuit board with more stability.

In addition, the first and second external electrodes 131 and 132 may be formed on a portion of the first side surface of the ceramic body 110.

The insulating layer 140 may be formed of at least one selected from the group consisting of epoxy, a heat-resistant polymer, glass, and ceramic material, but is not particularly limited thereto.

According to the embodiment of the invention, the insulating layer 140 may be formed of a ceramic slurry.

The position and thickness of the insulating layer 140 may be controlled by adjusting the amount and shape of the ceramic slurry.

The insulating layer 140 may be formed by forming the ceramic body through a burning process, and then applying the ceramic slurry to the ceramic body, followed by burning.

Alternatively, the insulating layer 140 may be formed by applying a ceramic slurry for forming the insulating layer on a ceramic green sheet constituting the ceramic body and then firing the ceramic slurry together with the ceramic green sheet.

A method of applying the ceramic slurry is not particularly limited. For example, the ceramic slurry may be sprayed by a spray method or may be printed by using a roller.

The insulating layer 140 covers the first lead out portion 121a exposed to one surface of the ceramic body, so that a short-circuit between the internal electrodes may be prevented and an internal defect such as deterioration in humidity-resistant characteristics, or the like, may be prevented.

According to the embodiment of the invention, the distance between the first and second internal electrodes to which voltages with different polarities are externally applied becomes relatively closer, resulting in shortening the current loop, so that equivalent series inductance (ESL) may be reduced.

Figure 7:
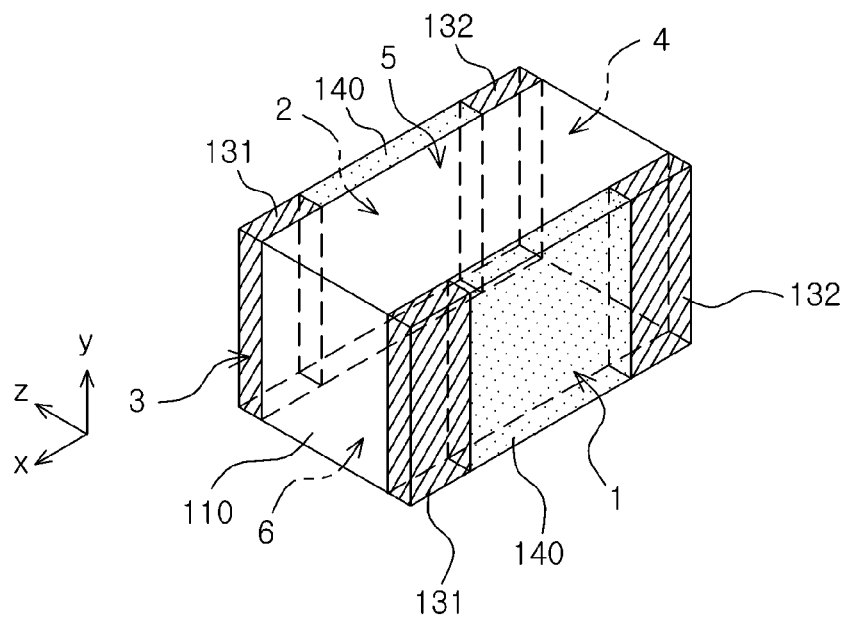
FIG. 7 is a perspective view showing a schematic structure of a multilayer ceramic capacitor according to another embodiment of the present invention.

FIG. 7 is a perspective view showing a schematic structure of a multilayer ceramic capacitor according to another embodiment of the present invention.

Figure 8:
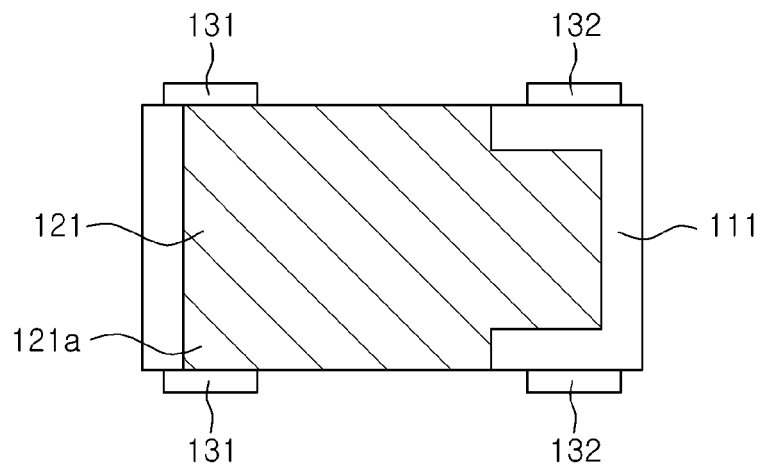
FIG. 8 is a cross-sectional view showing a combination structure of a first internal electrode and a first external electrode of FIG. 7.

FIG. 8 is a cross-sectional view showing a combination structure of a first internal electrode and a first external electrode of FIG. 7.

Figure 9:
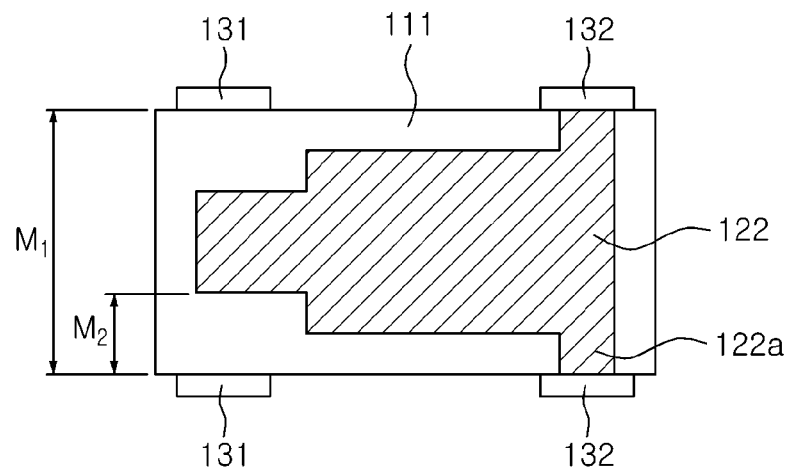
FIG. 9 is a cross-sectional view showing a combination structure of a second internal electrode and a second external electrode, of FIG. 7.

FIG. 9 is a cross-sectional view showing a combination structure of a second internal electrode and a second external electrode, of FIG. 7.

Figure 10:
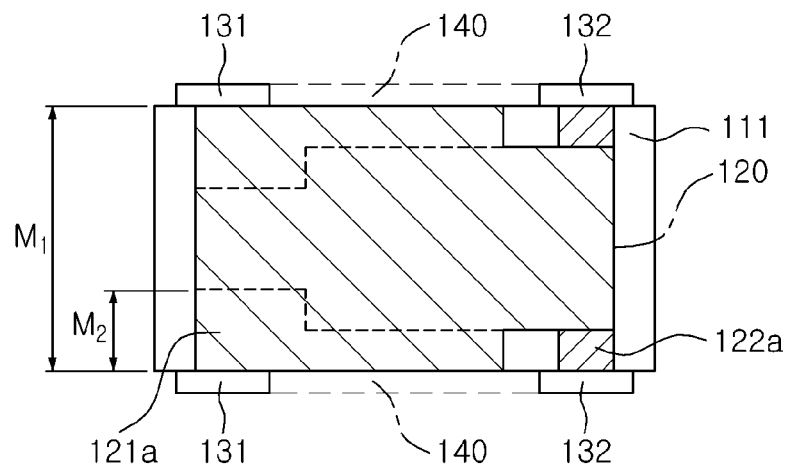
FIG. 10 is a cross-sectional view showing a combination structure of the first and second internal electrodes and the first and second external electrodes of FIG. 7.

FIG. 10 is a cross-sectional view showing a combination structure of the first and second internal electrodes and the first and second external electrodes of FIG. 7.

Referring to FIGS. 7 through 10, a multilayer ceramic electronic component according to another embodiment of the invention may include: a ceramic body 110 including dielectric layers 111, and having first and second main surfaces 5 and 6 facing each other, first and second side surfaces 1 and 2 facing each other, and first and second end surfaces 3 and 4 facing each other; first and second internal electrodes 121 and 122 having overlap regions forming a capacitance part 120 for forming capacitance inside the ceramic body 110, the first internal electrodes 121 respectively having a first lead out portion 121a extended from the capacitance part 120 so as to be exposed to the first and second side surfaces 1 and 2 and being spaced apart from the first and second end surfaces 3 and 4 by a predetermined distance, the second internal electrodes 122 being alternately laminated with the first internal electrodes 121 with the dielectric layers 111 therebetween while being insulated from the first internal electrodes 121, and the second internal electrodes 122 respectively having a second lead out portion 122a extended from the capacitance part 120 so as to be exposed to the first and second side surfaces 1 and 2 and being spaced apart from the first and second end surfaces 3 and 4 by a predetermined distance; first and second external electrodes 131 and 132 connected with the first and second lead out portions 121a and 122a, respectively, and formed on the first and second side surfaces 1 and 2; and an insulating layer 140 formed on the first and second side surfaces 1 and 2 of the ceramic body 110. Here, a length of the first lead out portion in a length direction of the ceramic body may be longer than a length of the second lead out portion in the length direction of the ceramic body, and the capacitance part 120 may include two regions having different distances from the first or second side surface.

When a width of the ceramic body is designated as $M_1$ and a distance of one of the two regions of the capacitance part from the first or second side surface, being a longer distance from the first or second side surface, is designated as $M_2$, $0.05 \leq M_2/M_1 \leq 0.4$ may be satisfied.

The first and second internal electrodes may be disposed vertically with respect to a mounting surface of the ceramic body.

The first external electrode may be extended to one or more of the first main surface, the second main surface, and the first end surface of the ceramic body.

The second external electrode may be extended to one or more of the first main surface, the second main surface, and the second end surface of the ceramic body.

The insulating layer may include at least one selected from the group consisting of epoxy, a heat-resistant polymer, glass, and a ceramic material.

The insulating layer may cover all of exposed portions of the first and second internal electrodes, which overlap each other.

The insulating layer may have a thickness lower than that of the first and second external electrodes, measured from the first or second side surface of the ceramic body.

Hereinafter, components different from those of the foregoing embodiment of the invention may be mainly described and detailed descriptions of the same components will be omitted.

According to another embodiment of the invention, the first lead out portion 121a and the second lead out portion 122a may be extended to be exposed to the first and second side surfaces 1 and 2 of the ceramic body 110, but are not limited thereto.

Meanwhile, the first and second internal electrodes 121 and 122 may be spaced apart from the first and second end surfaces 3 and 4 by a predetermined distance, respectively.

The first and second external electrodes 131 and 132 may be connected with the first and the second lead out portions 121a and 122a, respectively, and may be formed on the first and second side surfaces 1 and 2.

That is, the first and second external electrodes 131 and 132 of the multilayer ceramic capacitor according to another embodiment of the invention may be formed on the first side surface 1 and the second side surface 2.

According to another embodiment of the invention, the first lead out portion 121a and the second lead out portion 122a are extended to be exposed to the first and second side surfaces 1 and 2 of the ceramic body 110, so that the route for removing residual carbon may be further secured, thereby improving continuity of the internal electrode, and thus there may be an effect of increasing the capacitance.

In addition, a short circuit occurring between internal electrodes due to a phenomenon that facing internal electrodes are pushed by cutting stress at the time of cutting the ceramic body may be prevented.

Meanwhile, according to another embodiment of the invention, the insulating layer 140 may be formed on the first and second side surfaces 1 and 2 of the ceramic body 110, as shown in FIG. 10.

The insulating layer 140 may be formed between the first and second external electrodes 131 and 132.

The insulating layer 140 may cover the first lead out portion 121a exposed to the first and second side surfaces.

According to the embodiment of the invention, as shown in FIG. 10, the insulating layer 140 may completely fill one surface of the ceramic body 110 between the first and second external electrodes 131 and 132.

In addition, although not shown, according to the embodiment of the invention, the insulating layer 140 may cover only the first lead out portion 121a and have a predetermined interval from the first and second external electrodes 131 and 132.

According to the embodiment of the invention, the thickness of the insulating layer 140 may be lower than the thickness of the first external electrode 131 and the second external electrode 132. The thicknesses of the insulating layer and the first and second external electrodes may be measured based on the mounting surface, that is, the first side surface.

According to the present embodiment, since the thickness of the insulating layer is lower than the thickness of the first and second external electrodes, the multilayer ceramic capacitor 100 may be mounted on the circuit board with more stability.

In addition, the first and second external electrodes 131 and 132 may be formed on portions of the first and second side surfaces 1 and 2 of the ceramic body.

Table 1 below compares capacitance and incidence of short depending on the width of the ceramic body 110, $M_1$, and the distance of one of the two regions of the capacitance part 120 from the first side surface 1, being a longer distance from the first side surface 1, $M_2$, in the multilayer ceramic capacitor according to the embodiment of the invention.

TABLE 1

| | $M_2/M_1$ = 0.01 | $M_2/M_1$ = 0.03 | $0.05 \leq M_2/M_1 \leq 0.4$ | $M_2/M_1$ = 0.45 |
|---|---|---|---|---|
| Capacitance (μF) | 11.4 | 10.6 | 9.0~10.5 | 8.3 |
| Incidence of Short (%) | 90 | 45 | 10~15 | 4 |

Referring to Table 1 above, it may be seen that, in the multilayer ceramic capacitor according to the embodiment of the invention, the capacitance is decreased or the incidence of short is increased when the sample deviates from the numerical range according to the embodiment of the present invention.

Whereas, it may be seen that, when the sample satisfies the numerical range of the present invention, the capacitance is increased and the incidence of short is decreased.

According to the embodiment of the invention, the overlap region of the first and second internal electrodes may also be formed on a portion thereof exposed to the first side surface, so that the capacitance of the multilayer ceramic capacitor may be increased.

In addition, the first and second internal electrodes are alternately exposed to one side surface of the ceramic body, so that the short circuit occurring between internal electrodes may be rectified.

In addition, the distance between the first and second internal electrodes to which voltages with different polarities are externally applied becomes relatively close, resulting in shortening the current loop, so that equivalent series inductance (ESL) may be reduced.

As set forth above, according to the embodiments of the invention, the first and second internal electrodes are alternately exposed to one side surface of the ceramic body, so that a short circuit occurring between internal electrodes may be prevented.

Further, the capacitance part formed by overlapping the first internal electrode and the second internal electrode each other includes at least two regions which have different distances from one side surface of the ceramic body, so that the residual carbon may be significantly removed to increase the capacitance, and a defect such as the short circuit occurring between internal electrodes may be improved.

According to the embodiments of the invention, the overlap regions of the first and second internal electrodes, forming the capacitance part, are increased, so that capacitance of the multilayer ceramic capacitor may be increased.

Further, the distance between the first and second internal electrodes to which voltages with different polarities are externally applied becomes relatively closer, resulting in shortening the current loop, so that equivalent series inductance (ESL) may be reduced.

Further, according to the multilayer ceramic capacitor of one embodiment of the invention, the mounting area thereof on the printed circuit board may be significantly reduced and acoustic noise may be significantly reduced.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component, comprising:
    a ceramic body including dielectric layers, and having first and second main surfaces opposing each other, first and second side surfaces opposing each other, and first and second end surfaces opposing each other;
    first and second internal electrodes having overlap regions forming a capacitance part for forming capacitance inside the ceramic body, the first internal electrodes respectively having a first lead out portion extended from the capacitance part so as to be exposed to the first side surface, the second internal electrodes being alternately laminated with the first internal electrodes with the dielectric layers interposed therebetween while being insulated from the first internal electrodes, and the second internal electrodes respectively having a second lead out portion extended from the capacitance part so as to be exposed to the first side surface;
    first and second external electrodes connected with the first and second lead out portions, respectively; and
    an insulating layer formed on the first side surface of the ceramic body and between the first and second external electrodes, and covering an exposed portion of the first lead out portion,
    wherein a length of the first lead out portion in a length direction of the ceramic body is longer than a length of the second lead out portion in the length direction of the ceramic body, and the first lead out portion and the second lead out portion do not overlap each other,
    wherein the length of the first lead out portion is less than a length of the capacitance part of the first internal electrode in the length direction and the length of the second lead out portion is less than a length of the capacitance part of the second internal electrode in the length direction, and
    wherein the capacitance part includes at least two regions having different distances from the first side surface.

2. The multilayer ceramic electronic component of claim 1, wherein, when a width of the ceramic body is designated as $M_1$, and a distance of one of the two regions of the capacitance part from the first side surface, being a longer distance from the first side surface, is designated as $M_2$, $0.05 \leq M_2/M_1 \leq 0.4$ is satisfied.

3. The multilayer ceramic electronic component of claim 1, wherein the first and second internal electrodes are disposed vertically with respect to a mounting surface of the ceramic body.

4. The multilayer ceramic electronic component of claim 1, wherein the first external electrode is extended to at least one of the first main surface, the second main surface, and the second side surface of the ceramic body.

5. The multilayer ceramic electronic component of claim 1, wherein the second external electrode is extended to at least one of the first main surface, the second main surface, and the second side surface of the ceramic body.

6. The multilayer ceramic electronic component of claim 1, wherein the insulating layer includes at least one selected from the group consisting of epoxy, a heat-resistant polymer, glass, and a ceramic material.

7. The multilayer ceramic electronic component of claim 1, wherein the insulating layer covers all exposed portions of the first and second internal electrodes.

8. The multilayer ceramic electronic component of claim 1, wherein the insulating layer is lower than a thickness of the first and second external electrodes, measured from the first side surface of the ceramic body.

9. A multilayer ceramic electronic component, comprising:
    a ceramic body including dielectric layers, and having first and second main surfaces opposing each other, first and second side surfaces opposing each other, and first and second end surfaces opposing each other;
    first and second internal electrodes having overlap regions forming a capacitance part for forming capacitance inside the ceramic body, the first internal electrodes respectively having a first lead out portion extended from the capacitance part so as to be exposed to the first and second side surfaces and being spaced apart from the first and second end surfaces by a predetermined distance, the second internal electrodes being alternately laminated with the first internal electrodes with the dielectric layers interposed therebetween while being insulated from the first internal electrodes, and the second internal electrodes respectively having a second lead out portion extended from the capacitance part so as to be exposed to the first and second side surfaces and being spaced apart from the first and second end surfaces by a predetermined distance;
    first and second external electrodes connected with the first and second lead out portions, respectively, and formed on the first and second side surfaces; and
    an insulating layer formed on the first and second side surfaces of the ceramic body and between the first and second external electrodes, and covering an exposed portion of the first lead out portion,
    wherein a length of the first lead out portion in a length direction of the ceramic body is longer than a length of the second lead out portion in the length direction of the ceramic body, and the first lead out portion and the second lead out portion do not overlap each other, wherein the length of the first lead out portion is less than a length of the capacitance part of the first internal electrode in the length direction and the length of the second lead out portion is less than a length of the capacitance part of the second internal electrode in the length direction, and wherein the capacitance part includes two regions having different distances from the first and second side surface.

10. The multilayer ceramic electronic component of claim 9, wherein, when a width of the ceramic body is designated as $M_1$ and a distance of one of the two regions of the capacitance part from the first or second side surface, being a longer distance from the first or second side surface, is designated as $M_2$, $0.05 \leq M_2/M_1 \leq 0.4$ is satisfied.

11. The multilayer ceramic electronic component of claim 9, wherein the first and second internal electrodes are disposed vertically with respect to a mounting surface of the ceramic body.

12. The multilayer ceramic electronic component of claim 9, wherein the first external electrode is extended to at least one of the first main surface, the second main surface, and the first end surface of the ceramic body.

13. The multilayer ceramic electronic component of claim 9, wherein the second external electrode is extended to at least one of the first main surface, the second main surface, and the second end surface of the ceramic body.

14. The multilayer ceramic electronic component of claim 9, wherein the insulating layer includes at least one selected from the group consisting of epoxy, a heat-resistant polymer, glass, and a ceramic material.

15. The multilayer ceramic electronic component of claim 9, wherein the insulating layer covers all exposed portions of the first and second internal electrodes.

16. The multilayer ceramic electronic component of claim 9, wherein the insulating layer is lower than a thickness of the first and second external electrodes, measured from the first or second side surface of the ceramic body.

* * * * *